Figure 1:
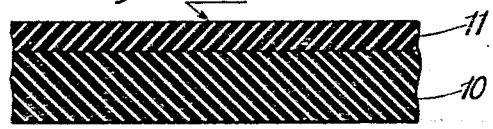

Feb. 8, 1944.          D. BULGIN          2,341,360
FIRE RESISTANT ELECTRICALLY CONDUCTIVE RUBBER ARTICLE
Filed Oct. 31, 1938

INVENTOR.
DOUGLAS BULGIN.
BY Benj. T. Rauber ATTORNEY

UNITED STATES PATENT OFFICE 2,341,360

FIRE RESISTANT ELECTRICALLY CONDUCTIVE RUBBER ARTICLE

Douglas Bulgin, Erdington, Birmingham, England, assignor to Dunlop Tire and Rubber Corporation, Buffalo, N. Y., a corporation of New York Application October 31, 1938, Serial No. 237,943
In Great Britain November 13, 1937

7 Claims. (Cl. 154—43)

My invention relates to improvements in or relating to the production of electrically conductive and fire or flame resistant articles composed wholly or mainly of rubber, including such related materials as gutta percha, balata and synthetic rubbers such as neoprene.

In certain uses, such as in the operating rooms of hospitals, it is very desirable to use rubber for flooring and for parts of the anaesthetising apparatus which is sufficiently conductive electrically to prevent the accumulation of static charges of electricity, and the discharge of which might cause the ignition of vapors used to produce anaesthesia. In the use of certain high voltage apparatus, for example, that used in diathermic treatments, there is also danger due to the voltage which may cause the passage of a current, through the conductive rubber, of sufficient intensity to cause ignition. Articles of electrically conductive rubber when exposed to electric heating effects such as the above are liable to ignite and, when ignited, to continue to burn even though the cause of the ignition should terminate. This is particularly the case when the rubber is in the form of thin articles such as conductive rubber sheets and tubes to which air is freely accessible.

In my present invention the danger of combustion and flame propagation in articles of the above type is obviated, or minimized, and articles of rubber having the required conductivity, particularly at the surface, and having a flame retardant or quenching action are provided.

In my invention fire resistant, electrically conductive articles of rubber are formed with a surface layer of electrically conductive rubber or rubber-like material and a supporting layer of rubber composition which is electrically non-conductive, or relatively so, and which is of a thickness equal to, or exceeding, that of the conductive surface layer. The conductive surface layer may be provided with a relatively large proportion of conductive ingredients, generally solid, such as conductive forms of carbon. It may contain also some flame retardant materials, but only a relatively small amount of such materials can be incorporated without reducing the rubber content excessively. In the underlying layer, however, in which there need be little or no conductive material, there is incorporated a large quantity of materials that resist or inhibit propagation of flame. These materials may act to absorb heat rapidly and thus to reduce the temperature below the ignition point, or may be of such nature as to evolve flame smothering gases, such as carbon dioxide, at or above the ignition temperature either with or without heat absorbing action. A number of such materials may be incorporated in the underlying flame resistant or repellent layer.

Figure 2:

In the accompanying drawing which illustrates diagrammatically embodiments of the invention, Fig. 1 is a cross section of a sheet embodying two layers, one being flame resistant and the other conductive. Fig. 2 is a similar section of a sheet containing a flame resistant layer covered on opposite faces with conductive surface layers.

In the embodiment shown in Fig. 1, a layer 10 of flame retardant rubber, for example, a rubber mix containing incombustible flame smothering materials or materials that evolve incombustible smothering gases, or a mixture of such materials, is covered with a layer 11 which is rendered conductive by being compounded with conductive materials.

As an illustration of suitable compositions for the conductive layer, a mix of the following compositions may be employed:

| | |
|---|---:|
| Rubber | 60.5 |
| Sulphur | 2.25 |
| Zinc oxide | 4.5 |
| Stearic acid | 2.0 |
| Paraffin wax | 2.0 |
| Antioxidant | 0.5 |
| Mercaptobenzthiazole | 0.75 |
| Acetylene black | 28.0 |

The nature and functions of the various ingredients in the above mix are commonly understood in the rubber art and the usual equivalents may, therefore, be substituted. Also the class of conductive elements or materials are generally known, and those commonly used and having no deleterious action on the rubber may be employed.

The above mix is calendered into sheets and is applied in an unvulcanized state to unvulcanized sheets calendered from a mix of the following composition:

| | |
|---|---:|
| Rubber | 33.0 |
| Sulphur | 2.5 |
| Zinc oxide | 20.0 |
| China clay | 24.0 |
| Stearic acid | 2.0 |
| Mercaptobenzthiazole | 0.5 |
| Asbestine | 18.0 |

In the above composition, zinc oxide, China clay and asbestine are incombustible substances which readily absorb heat generated by combustion and tend to reduce the temperature below the ignition temperature. In the above composition it will be noted that these materials exceed over 50% by weight of the composition.

The composite sheet thus formed is then vulcanized for 30 minutes at 150 pounds per square inch of steam pressure, and the vulcanized sheet may be used as surface material for floors. When used as flooring, a suitable thickness for the conductive layer is about 3 millimeters applied to a non-conductive layer of the same or greater thickness. For use with apparatus, the unvulcanized composite sheet may be formed into a tube, or into other shapes or articles, and subsequently vulcanized. When used for tubing, the conductive layer may be about 0.25 millimeter in thickness and be applied to a non-conductive layer of the order of 1.25 millimeters in thickness.

Substances capable of improving the fire resistant properties of rubber may be added to the above compositions prior to vulcanization. Examples of such substances are selenium, chlorinated rubber or chlorinated hydrocarbons, or mixtures thereof. A layer of mica or asbestos fiber may be embedded prior to vulcanization in the common surface of the conductive and non-conductive layers of rubber. Substances which evolve carbon dioxide, or other inert smothering gases, above the vulcanization temperature and below the ignition temperature may be incorporated into either or both of the layer compositions. Examples of such materials are magnesium carbonate and ammonium phosphate. These substances are capable of evolving incombustible gases such as carbon dioxide, ammonia, or water vapor, when heated above 200° C., which is above the normal temperature of vulcanization. Other non-gas evolving flame smothering agents such as boric acid or borates may be used.

The sheets or articles may be formed of three layers, the outermost being conductive and the inner non-conductive.

The conductive layer may be applied by spraying, dipping or painting a solution or emulsion of the conductive mix onto one or more surfaces of the non-conductive sheet before or after vulcanization of the latter, with or without subsequent vulcanization of the conductive layer so applied.

A sheet solely of electrically conductive rubber of 2 millimeters in thickness when exposed to a high voltage electric arc caught fire in 20 seconds and continued to burn. In contrast, a composite sheet of the same thickness of the present invention consisting of a conductive layer 0.35 millimeter thick, and a non-conductive layer 1.65 millimeters thick, caught fire only after being subjected to the same arc for 150 seconds and did not continue to burn upon removal of the arc.

What I claim is:

1. A fire resistant electrically conductive vulcanized rubber having a surface layer of electrically conductive rubber composition, and an underlying rubber composition containing incombustible, flame smothering material.

2. A fire resistant electrically conductive vulcanized rubber article having a surface layer of electrically conductive rubber composition, and an underlying layer of rubber composition containing material evolving incombustible, flame smothering gases above the vulcanizing temperature and below the ignition temperature of rubber.

3. The article of claim 2 in which said gas evolving material is a carbonate.

4. The article of claim 2 in which said gas evolving material is an ammonium compound.

5. The article of claim 1 in which said incombustible flame smothering material is a mineral.

6. A fire resistant electrically conductive vulcanized rubber having a surface layer of electrically conductive rubber composition and an underlying rubber composition containing an incombustible, flame smothering borate.

7. A fire resistant electrically conductive vulcanized rubber having a surface layer of electrically conductive rubber composition and an underlying rubber composition containing over 50 per cent by weight of incombustible, flame smothering material.

DOUGLAS BULGIN.